Dec. 18, 1951     B. L. ORGAN     2,579,087
LIGHTED FISHING ROD
Filed Nov. 6, 1947
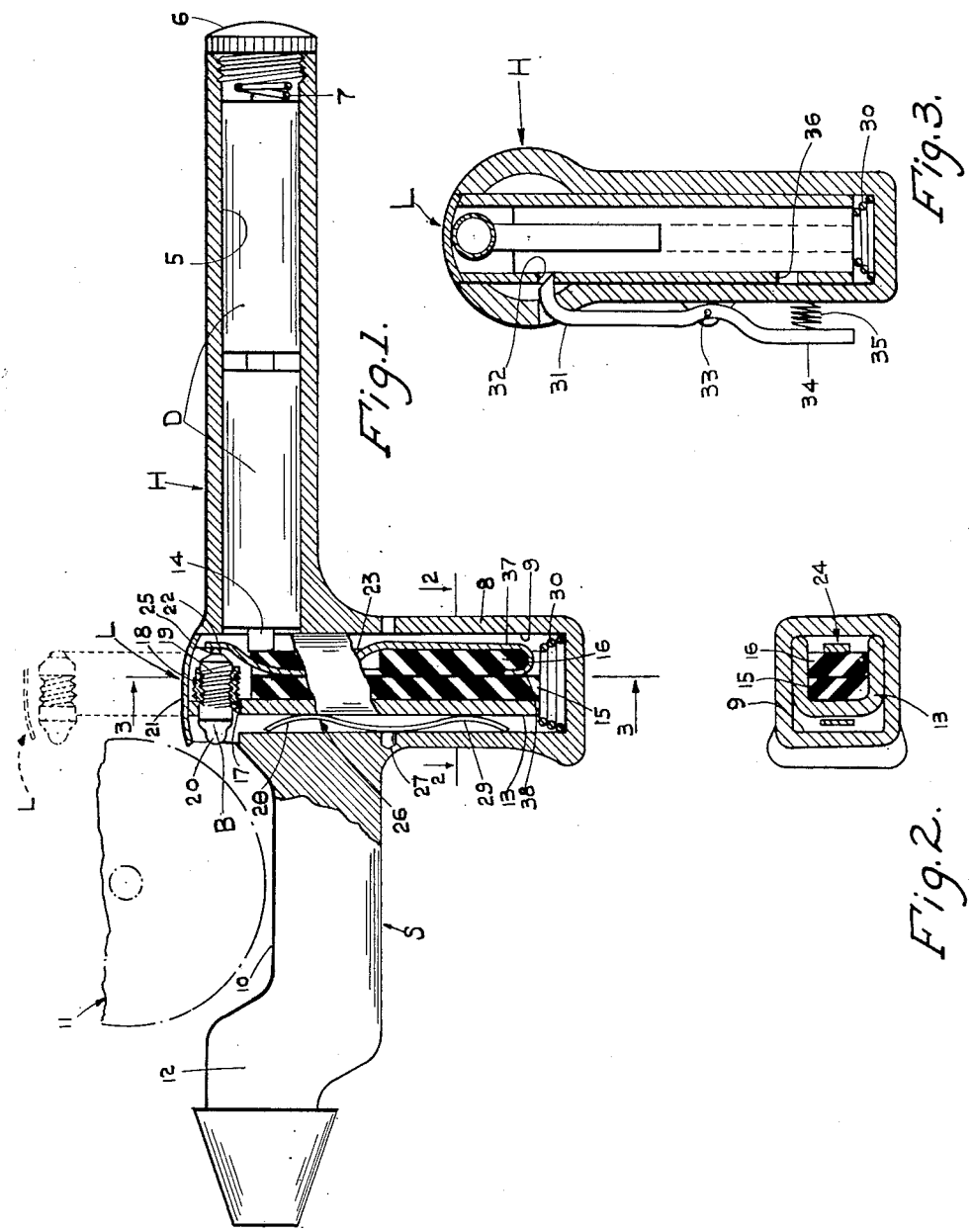
INVENTOR.
Burnette L Organ
BY
Emerson B Donnell Patented Dec. 18, 1951

2,579,087

UNITED STATES PATENT OFFICE 2,579,087

LIGHTED FISHING ROD

Burnette L. Organ, Racine, Wis.

Application November 6, 1947, Serial No. 784,463

11 Claims. (Cl. 240—6.4)

The present invention relates to fishing equipment and particularly to casting rods embodying a reel and reel seat, and an object of the invention is to provide means for illuminating the reel and reel seat and also other portions of the rod and line so that the equipment may be readily used for night fishing. A further object is to provide such a device which will have a neat and compact appearance at all times and which will have no objectionable protuberances at such times as the illuminating apparatus is not in use; in which the light source is disposed in an advantageous position when in use but is substantially invisible and out of the way at other times; in which the shifting of the light source automatically establishes the lighting circuit; in which the movable element is accurately guided to position; in which facilities are provided for readily shifting the light source; and in which the processes of manufacturing and servicing the device are convenient and economical.

Other objects and advantages will be apparent from the following specification and accompanying drawings in which a satisfactory embodiment of the invention is shown, but it is to be understood that the invention is not intended to be taken as limited to this particular embodiment or in fact in any manner except as herein set forth.

In the drawings—

Fig. 1 is a left side view mostly in vertical axial section of so much of a casting rod as necessary to illustrate the invention.

Fig. 2 is a horizontal section taken on the line 2—2 of Fig. 1, and

Fig. 3 is a vertical section on the line 3—3 of Fig. 1.

Similar reference characters have been applied to the same parts throughout the drawings and specification.

As evident from Fig. 1, the invention is embodied in the handle or grip portion of the fishing rod comprising a handle proper generally designated as H, a reel seat S, and a light support L which may be shifted from a retracted position as shown in full lines in Fig. 1 to a working position as indicated in dotted lines in the same. The light support L carries a bulb B which is lighted from a plurality of dry cells D or equivalent source of electrical energy in a manner which will appear.

Returning to a more detailed description of the construction, the element forming the handle H and the reel seat S may be formed in any suitable manner within the contemplation of the invention but is preferably made from a die-casting of metal suitable for the purpose and in which the various bores and recesses may be readily formed as a part of the molding process. Handle portion H has a bore 5 which accommodates dry cells D in the manner common to an ordinary flashlight, a cap 6 being threadedly or otherwise suitably retained in closing relation to bore 5. A compression spring 7 urges dry cells D toward the left and establishes electrical connection between the end of one of the cells D and the conductive metallic casing or handle portion H. A downwardly extending housing or guide portion 8 is disposed between handle portion H and reel seat S and has a bore 9 which is preferably, although not necessarily, rectangular or of other non-circular cross section as best seen in Fig. 2. Bore 9 intersects above mentioned bore 5 and constitutes the main guiding means for light support L.

Reel seat S requires no further description except to say that it has a surface 10 which reel 11 engages and to which it is attached in any suitable manner not necessary to further describe, and the remainder of the rod (not shown) continues from a portion 12 in well-known manner forming no part of the invention.

Since it is desirable to illuminate reel 11 and the region beyond attaching portion 12, lamp support L is arranged to support bulb B in a position somewhat above reel 11 and facing lengthwise of the rod. The support comprises a tube-like element 13 preferably of rectangular or other non-circular cross section and desirably slightly wider than above mentioned bore 9. Tube 13 is incomplete or open on its right side as seen in Figs. 1 and 2, which will result in a slight yielding quality to facilitate sliding movement in bore 9. The open side of tube 13 also receives the terminal 14 of one of the cells D, the interior of tube 13 being substantially filled with insulating material preferably in the form of strips 15 and 16, strip 16 being in contact with terminal 14 so that no electric circuit is completed when the lamp support L is in depressed position.

Tube 13 has an upstanding portion 17 to which is soldered or otherwise suitably united a socket portion 18 into which may be inserted above mentioned bulb B. While the invention is not limited to any particular style of bulb, in the present instance the bulb is one of a well-known type having a screw base 19 and a projecting lens 20 incorporated in the glass envelope. In this manner the light source and the projector are incorporated in the same unit. A cap or cover 21 is fixed to tube portion 17 and in the position of the parts shown closes the upper end of opening 9, preferably fitting substantially flush with handle portion H. Cap 21 also projects forwardly over bulb B to act as a protection and also as a shade to intercept stray light from the bulb and to shield the eyes of the user.

The electrical circuit to bulb B is completed through a conductor, strip or contact 22 received between above mentioned strips of insulation 15 and 16, strip 16 being suitably cut away to make room if necessary. Strip 22, in the position shown, is insulated from terminal 14 by strip 16 so that bulb B is not lighted with the parts in this position. Strip 22, however, emerges from between strips 15 and 16 through an opening 23 and, throughout the remainder of the length of strip 16 lies along the outer surface thereof between the edges of the open side of tube 13, as best seen in Fig. 2 at 24. Terminal 14 does not touch tube 13, but, when support L is moved upwardly in bore 9 contact is made between strip 22 and terminal 14, thus completing a circuit through housing 8, tube 13, base portion 19, bulb B to a button portion 25 thereof. From there the circuit continues through strip 22 (which is in contact with button 25) to terminal 14. A generous range of movement of support L is possible while maintaining the light, in view of the length of strip 22 exposed on the outer surface of strip 16, strip 22 sliding on terminal 14, which is in turn maintained in contact therewith by spring 7. The light, however, is automatically extinguished by breaking of the contact between terminal 14 and strip 22 whenever the support L is retracted.

The construction so far described is operable for the purpose intended, but certain refinements are contemplated which will now be described. As above mentioned, tube 13 is slightly larger than bore 9 so that it is somewhat compressed when introduced into the bore. It therefore exerts a gentle outward pressure against the bore on the sides which is effective to eliminate all lost motion or side play. This ready resiliency of tube 13 is possible because of the open character of the same and the slight yielding quality of the insulation 15 and 16.

In order to avoid lost motion in a fore-and-aft direction a slightly different arrangement is preferably used. Bore 9 is larger than tube 13 to an extent sufficient to admit a leaf spring having a guiding pin 27 and arched end portions 28 and 29, which press backwardly against tube 13 so as to maintain it against the back wall of bore 9 and prevent displacement by the pressure of spring 7. The friction produced by the rubbing action in bore 13 and against spring 26 serves effectively to maintain support L in adjusted position, but need not be sufficient to prevent shifting easily.

A spring 30 is compressed in the bottom of bore 9 for initiating upward movement of support L, the spring being powerful enough so that it can overcome the frictional resistance to sliding movement of support L, and a detent lever having a latch portion 31 engaging an opening 32 in tube 13, a fulcrum pin 33 and a handle or trigger portion 34, maintains tube 13 in its retracted position against the pressure of spring 30. A spring 35 presses portion 34 outwardly and thereby maintains portion 31 in engagement with opening 32. Pressure on portion 34 causes portion 31 to release tube 13, which is forced upwardly a short distance by spring 30 so that it can be grasped by the fingers and pulled up as far as desired. To prevent pulling of the tube inadvertently entirely out of the bore a second opening 36 is provided which is engaged by latch portion 31 at the desired upper limit of movement. If it is desired to remove tube 13 entirely from bore 9, it is only necessary to press portion 34 a second time, when tube 13 will no longer be retained in bore 9. The tube may be replaced by merely sliding it into position. Strip 22 is preferably sloped inwardly at 37 so as to be effective in pressing terminal 14 out of the way during this operation, and the strip may be retained in position by a return bend extending upwardly between strips 15 and 16, as shown at 38.

The operation of the device is thought to be clear from the above, it being noted that manufacture and assembly of the device is relatively simple, the portions H and S being readily formed with their various bores and other configurations in the die casting operation. Spring 30 is inserted in bore 9 from the top and retained by its natural resiliency which causes it to expand against the walls thereof. Spring 26 is readily inserted from above and pin 27 engaged with its retaining hole, after which support L is inserted. Latch lever 31 can be applied either before or after this operation.

The novel combinations and arrangements will now be apparent, which have been provided for the accomplishment of the objects of the invention above set forth, and what is claimed as new and desired to be secured by Letters Patent of the United States is:

1. In a casting rod a handle having a grip portion and including a path for electrical energy, and a reel seat spaced from the grip portion, a lamp support disposed between said grip portion and said reel seat and movable transversely of the general direction of said rod from an active position for projecting a beam of light past said reel along said rod, to a retracted position, a lamp on said support, said lamp including a base portion and a button portion, an electrical energy source associated with said handle and having a plurality of terminals, a contact on said lamp support in position to contact one of said terminals and to receive energy when said lamp support is in an active position, said contact being also in connection with said button portion on said lamp, said lamp support comprising an open sided tube of conductive material, said handle providing a bore in which said tube is slidable, said bore being smaller than said open sided tube so that said tube is compressed therein, and said tube being connected with said path for electrical energy, the major portion of said tube being filled with insulation consisting of a plurality of layers having a portion of said contact therein, said insulation contacting said terminal in the retracted position of said lamp support to prevent flow of electrical energy therefrom, and a bulb receiving socket portion carried by said tube, and connected thereby with said path for electrical energy, the other terminal of said source of electrical energy being also connected with said path.

2. In a casting rod a handle having a grip portion and a reel seat spaced from the grip portion, a lamp support disposed between said grip and said reel seat and movable from an active to a retracted position, a lamp on said support, an electrical energy source associated with said handle and having a terminal, a contact on said lamp support in position to receive energy when said lamp support is in active position, said lamp support comprising an open-sided tube of conductive material, said handle providing a bore in which said tube is slidable, the major portion of said tube being filled with insulation consisting of a plurality of layers having a conductive element therebetween, said insulation contacting said terminal in the retracted position of said lamp support to prevent flow of electrical energy therefrom.

3. In a casting rod a handle having a grip portion and a reel seat spaced from the grip portion, a lamp support disposed between said grip and said reel seat and movable transversely of the general direction of said rod from an active position for projecting a beam of light past said reel along said rod, to a retracted position, a lamp on said support, an electrical energy source associated with said handle, a contact on said lamp support in position to receive energy when said lamp support is in an active position, said lamp support comprising an open-sided tube of conductive material, said handle providing a bore in which said tube is slidable, the major portion of said tube being filled with insulation having a conductive element therein, a bulb receiving socket portion carried by said tube, said conductive element projecting in proximity to said socket to form a center contact for said socket and emerging from said insulation within the open side of said tube at a point spaced from said socket to form the above mentioned contact, and a cap carried by said tube in position to close the opening in said handle portion when said tube is in its retracted position.

4. In a casting rod a handle having a grip portion and a reel seat spaced from the grip portion, a lamp support disposed between said grip and said reel seat and movable transversely of the general direction of the rod from an active position for projecting a beam of light past said reel along said rod, to a retracted position, a lamp on said support, an electrical energy source associated with said handle, a contact on said lamp support in position to receive energy when said lamp support is in an active position, said lamp support comprising an open-sided tube of conductive material, said handle providing a bore in which said tube is slidable, the major portion of said tube being filled with insulation having a conductive element therein, a bulb receiving socket portion carried by said tube, said conductive element projecting in proximity to said socket to form a center contact for said socket and emerging from said insulation within the open side of said tube at a point spaced from said socket to form the above mentioned contact, a cap carried by said tube in position to close the opening in said handle portion when said tube is in its retracted position, and spring means in said bore, positioned to press against one side of said tube and force it into sliding contact with the opposite side of said bore, said spring being of flat arched configuration and having a pin engaged in a bore transverse to the first mentioned bore to prevent movement of said spring axially of said first mentioned bore.

5. In a casting rod a handle having a grip portion and a reel seat spaced from the grip portion, a lamp support disposed between said grip and said reel seat and movable transversely of the general direction of the rod from an active position for projecting a beam of light past said reel and along said rod, to a retracted position, a lamp on said support, an electrical energy source associated with said handle, a contact on said lamp support in position to receive energy when said lamp support is in an active position, said lamp support comprising an open-sided tube of conductive material, said handle providing a bore in which said tube is slidable, the major portion of said tube being filled with insulation having a conductive element therein, a lamp receiving socket portion carried by said tube, said conductive element projecting in proximity to said socket to form a center contact for said socket and emerging from said insulation within the open side of said tube at a point spaced from said socket to form the above mentioned contact, a cap carried by said tube in position to close the opening in said handle portion when said tube is in its retracted position, and a compression spring in said bore and so disposed as to press upwardly against said lamp support to slide said support upwardly in said bore to a position where it can be grasped and pulled further out.

6. In a casting rod a handle having a grip portion and a reel seat spaced from the grip portion, a lamp support disposed between said grip and said reel seat and movable transversely of the general direction of said rod from an active position for projecting a beam of light past said reel and along said rod, to a retracted position, a lamp on said support, an electrical energy source associated with said handle, a contact on said lamp support in position to receive energy when said lamp support is in an active position, said lamp support comprising an open-sided tube of conductive material, said handle providing a bore in which said tube is slidable, the major portion of said tube being filled with insulation having a conductive element therein, a bulb receiving socket portion carried by said tube, said conductive element projecting in proximity to said socket to form a center contact for said socket and emerging from said insulation within the open side of said tube at a point spaced from said socket to form the above mentioned contact, a cap carried by said tube in position to close the opening in said handle portion when said tube is in its retracted position, a compression spring in said bore and so disposed as to press upwardly against said lamp support to slide said support upwardly in said bore to a position where it can be grasped and pulled further out, and detent means on said handle and having a portion entering therein and engaging said lamp support, the latter providing an opening engaging said detent portion so as to maintain said support in lowered position.

7. In a casting rod a handle having a grip portion and a reel seat spaced from the grip portion, a lamp support disposed between said grip and said reel seat and movable transversely of the general direction of said rod from an active position for projecting a beam of light past said reel and along said rod, to a retracted position, a lamp on said support, an electrical energy source associated with said handle, a contact on said lamp support in position to receive energy when said lamp support is in an active position, said lamp support comprising an open-sided tube of conductive material, said handle providing a bore in which said tube is slidable, the major portion of said tube being filled with insulation having a conductive element therein, a lamp receiving socket portion carried by said tube, said conductive element projecting in proximity to said socket to form a center contact for said socket and emerging from said insulation within the open side of said tube at a point spaced from said socket to form the above mentioned contact, a cap carried by said tube in position to close the opening in said handle portion when said tube is in its retracted position, a compression spring in said bore and so disposed as to press upwardly against said lamp support to slide said support upwardly in said bore to a position where it can be grasped and pulled further out, detent means on said handle and having a portion entering therein and engaging said lamp support, the latter providing an opening engaging said detent portion so as to maintain said support in lowered position, and said support also providing a second opening positioned to engage said detent portion and prevent inadvertent complete withdrawal of said support from said handle portion, means for yieldably urging said detent into engagement with said openings and means for overcoming said urging means and releasing said detent from said openings.

8. Lighting means for a casting rod, said rod having a handle including a grip portion and a reel seat portion spaced from said grip portion generally in the direction of the rod, a reel on said reel seat portion, said lighting means including a guide portion extending from the handle transversely of the general direction of the rod between the grip portion and the reel seat portion and having a guiding bore substantially normal to said general direction of the rod, an elongated lamp support slidable in the guide portion and having a lamp at one end thereof, said lamp being so positioned on said support as to project a beam of light substantially normal to said lamp support, said guiding bore being open in the direction opposite to the extension of said guiding portion from said handle, and said lamp support being of a size to substantially fill the bore in one position and slidable to a position extending from said handle in a direction substantially opposite to that in which said guiding portion extends, said lamp being carried at the extending end of said lamp support and supported, when so extending, in a position to project a beam of light past said reel and along the length of the rod.

9. A lighting means as defined in claim 8, said lamp support having a cap beyond the lamp positioned to close the open end of said bore at such times as said lamp support is entirely within said bore.

10. A lighting means as defined in claim 8 having a source of electrical energy in said grip portion and connections therefrom to said lamp for energizing said lamp.

11. A lighting means as defined in claim 10 having circuit making means slidable with said lamp support when the latter is shifted into extending position for establishing by such sliding movement when said support is so shifted, an electrical connection between said source of electrical energy and said lamp.

BURNETTE L. ORGAN.

REFERENCES CITED

The following references are of record in the file of this patent:

UNITED STATES PATENTS

| Number | Name | Date |
| --- | --- | --- |
| 1,507,728 | Burgard | Sept. 9, 1924 |
| 2,152,385 | Mayer et al. | Mar. 28, 1939 |
| 2,283,430 | Frettem | May 19, 1942 |

FOREIGN PATENTS

| Number | Country | Date |
| --- | --- | --- |
| 318,852 | Germany | Feb. 16, 1920 |